United States Patent [19]

Hayes et al.

[11] 4,203,721
[45] May 20, 1980

[54] METHOD OF HEATING PLASTIC PIPE

[76] Inventors: Fay A. Hayes, 242 NW. 12th Ave., Boca Raton, Fla. 33432; Leonard L. Hayes, 1906 10th Ave., Lewiston, Id. 83501

[21] Appl. No.: 21,586

[22] Filed: Mar. 19, 1979

Related U.S. Application Data

[62] Division of Ser. No. 902,443, May 3, 1978.

[51] Int. Cl.² .................................................. F27D 5/00
[52] U.S. Cl. .......................................... 432/10; 432/27
[58] Field of Search .................. 432/10, 27, 197, 224, 432/225; 165/104 R, 104 N; 425/403

[56] References Cited

U.S. PATENT DOCUMENTS

| | | | |
|---|---|---|---|
| 1,833,130 | 11/1931 | Roe | 165/104 M |
| 4,014,640 | 3/1977 | Emery et al. | 432/10 |

*Primary Examiner*—John J. Camby
*Attorney, Agent, or Firm*—Zarley, McKee, Thomte, Voorhees & Sease

[57] ABSTRACT

An inplace gasket belling machine wherein a plastic pipe is received in a tilt clamp fixture and tilted thereon for receiving a heating bell on one end portion of the pipe. Heated fluid is directed over the inserted pipe end portion. The heating bell may be withdrawn from the pipe in intermittent steps to afford a temperature gradient along the pipe end portion. The pipe is then tilted to a horizontal disposition for the insertion of a gasket belling mandrel into the heated end portion of the pipe. A gasket magazine is supported adjacent the mandrel for automatically placing an annular gasket on the mandrel for insertion into the pipe end portion. The mandrel includes an outer housing and a mandrel body portion telescopically received within the outer housing. The outer housing has a stop shoulder and a gasket positioning sleeve extended forwardly therefrom. The mandrel body portion has a flared pipe expanding portion and a gasket carrying portion rearwardly thereof. Upon insertion of the flared portion into the heated end of the pipe, the outer housing collapses onto the mandrel body portion for precise positioning of the gasket within the pipe end portion. Upon withdrawal of the gasket positioning sleeve from said pipe end portion, the pipe end portion is collapsed by vacuum means onto the mandrel body portion and cooled prior to withdrawal of the mandrel body portion from the belled pipe end portion.

5 Claims, 14 Drawing Figures

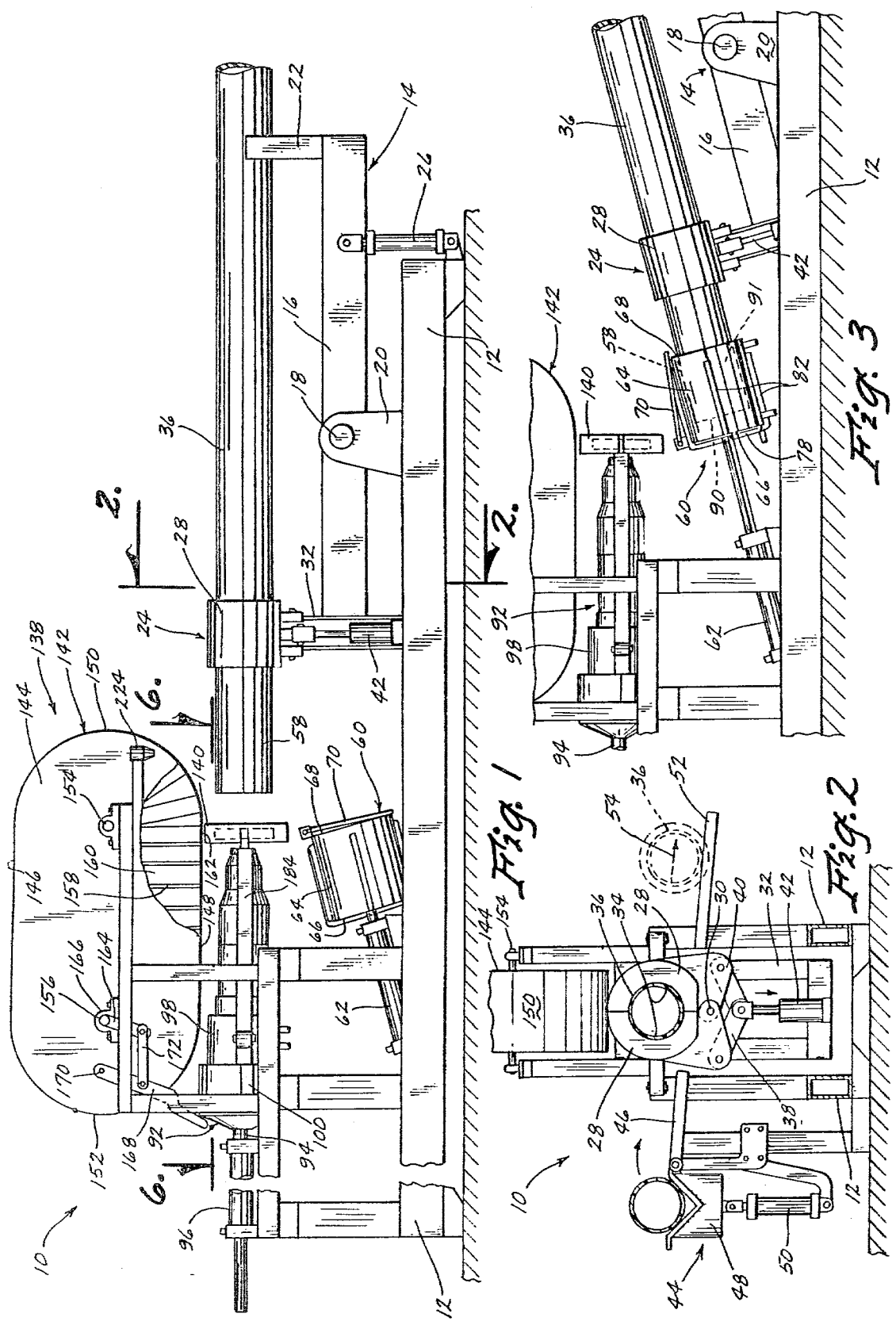

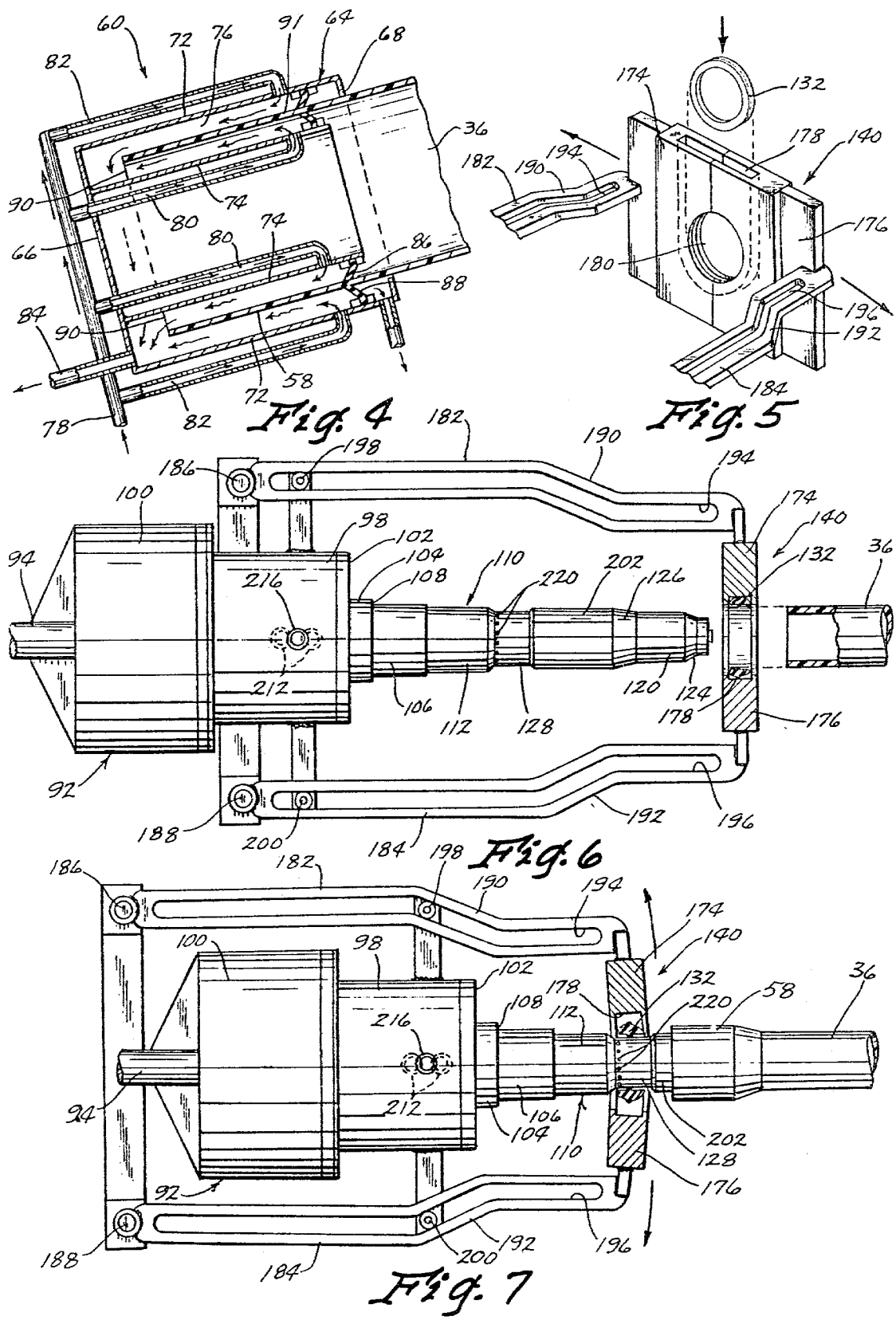

METHOD OF HEATING PLASTIC PIPE

This application is a divisional application from co-pending parent application Ser. No. 902,443, filed May 3, 1978.

BACKGROUND OF THE INVENTION

This invention relates to improvements in an inplace gasket belling machine and more particularly to improved means for supporting a pipe in the machine, improved means for heating one end portion of the pipe, an improved belling mandrel and means for automatically placing a gasket on the belling mandrel.

Presently known inplace gasket belling machines have several shortcomings which are resolved by the improvements of the present invention. Generally, the pipe end portion to be belled is heated by standing the pipe on end and immersing the end portion into a bath of heated fluid. Problems associated with this method of heating are first, that substantial vertical clearance is required for standing the pipes on end and second, that the entire end portion of the pipe is heated to a generally uniform temperature so that a substantial temperature interface is formed between the immersed and non-immersed portions. The sudden temperature change along the pipe increases the chances of the end portion being axially collapsed during insertion of the belling mandrel.

A related problem associated with the immersion type heating of the pipe end portion is that somewhat complex pipe handling apparatus has been required for supporting the pipe in perpendicularly related heating and belling positions.

It has generally been the practice to manually place gaskets on the belling mandrel in order to provide clearance for passage of the mandrel into the heated end portion of a pipe. This operation thus necessitates operator assistance with the belling of each pipe.

Conventional inplace gasket belling machines have heretofore employed a fixed mandrel and a single speed drive means for advancing the mandrel into one end of a pipe. The speed of the drive means is generally a compromise between a relatively fast speed conducive to expanding the pipe end portion and a slow speed conducive to accurate depth control of the mandrel within the pipe. Furthermore, it has been necessary to provide independent drive means for a gasket positioning sleeve on the mandrel because of the required axial movement of the sleeve relative to the mandrel during the belling operation.

It is believed that all of the above-mentioned shortcomings are resolved by the improved inplace gasket belling machine of the present invention.

SUMMARY OF THE INVENTION

The inplace gasket belling machine of the invention includes an axially movable belling mandrel and a heating bell movably supported adjacent the mandrel at an inclination to the axis of the mandrel. The pipe to be belled is supported on a simple tilt clamp fixture which may be tilted an acute angle for movement of the pipe between a heating position in alignment with the heating bell and a belling position in alignment with the belling mandrel. A pipe clamp on the fixture securely holds a pipe during both the heating and belling operations and opens for releasing a finished pipe and receiving another pipe to be belled.

The heating bell of the invention includes means for advancing the bell onto one end portion of a pipe supported in the heating position therefor. By withdrawing the heating bell from the pipe end portion in selected intermittent steps, a temperature gradient may be set up in the pipe end portion. Accordingly, the tip of the pipe may be heated to a predetermined temperature substantially higher than the innermost end of said pipe end portion. The temperature interface between the heated and non-heated portions of the pipe is thus minimized thereby improving the structural integrity of the pipe during the belling operation. Since the heating bell is inclined at an acute angle to the axis of the belling mandrel, the pipe need be inclined only an acute angle for movement between the heating and belling positions therefor. As a result, little if any vertical clearance is required above the height of the machine.

The present invention also includes a gasket magazine for sequentially dispensing annular gaskets to a gasket holding ring situated in the path of the mandrel for automatic placement of a gasket onto the mandrel. The gasket holding ring includes opposite side portions which are automatically laterally separated to provide free passage of the mandrel therebetween. Since both the gasket magazine and gasket holding ring are operatively controlled by movement of the mandrel, no separate drive means is required for these members nor is operator assistance required for the belling operation other than to occasionally replenish the supply of gaskets within the magazine.

The belling mandrel of the invention includes a mandrel body portion telescopically received within an outer housing. The body portion includes means for radially expanding the pipe and for carrying the gasket into the pipe end portion. The outer housing includes a stop shoulder and a gasket positioning sleeve extended forwardly therefrom for accurately positioning the gasket within the pipe end portion when the stop shoulder is advanced to engage the end of the pipe. A spring which biases the body portion forwardly of the outer portion permits the body portion to be retained within the pipe while the gasket positioning sleeve is withdrawn therefrom so that the expanded end portion of the pipe may be collapsed onto the body portion by vacuum means prior to withdrawal of the body portion from the pipe. A single drive cylinder thus controls the movement of both telescoping portions of the mandrel.

BRIEF DESCRIPTION OF THE DRAWINGS

Other features and advantages of the invention will become apparent upon reading the following detailed description and upon reference to the drawings, in which:

FIG. 1 is a foreshortened side elevational view of the inplace gasket belling machine;

FIG. 2 is a front sectional view of the machine taken along line 2—2 in FIG. 1;

FIG. 3 is a detail side elevational view showing the heating bell advanced onto an end portion of a downwardly tilted pipe supported in the tilt clamp fixture;

FIG. 4 is an enlarged side sectional view of the heating bell with a pipe end portion received therein;

FIG. 5 is an enlarged detail perspective view of the gasket holding ring;

FIG. 6 is a top partially sectional view taken along line 6—6 in FIG. 1 showing the gasket holding ring disposed within the path of the mandrel;

FIG. 7 is a top partially sectional view, similar to FIG. 6, but showing the mandrel advanced for receiving a gasket from the gasket holding ring;

DESCRIPTION OF THE PREFERRED EMBODIMENT

Figure 8:
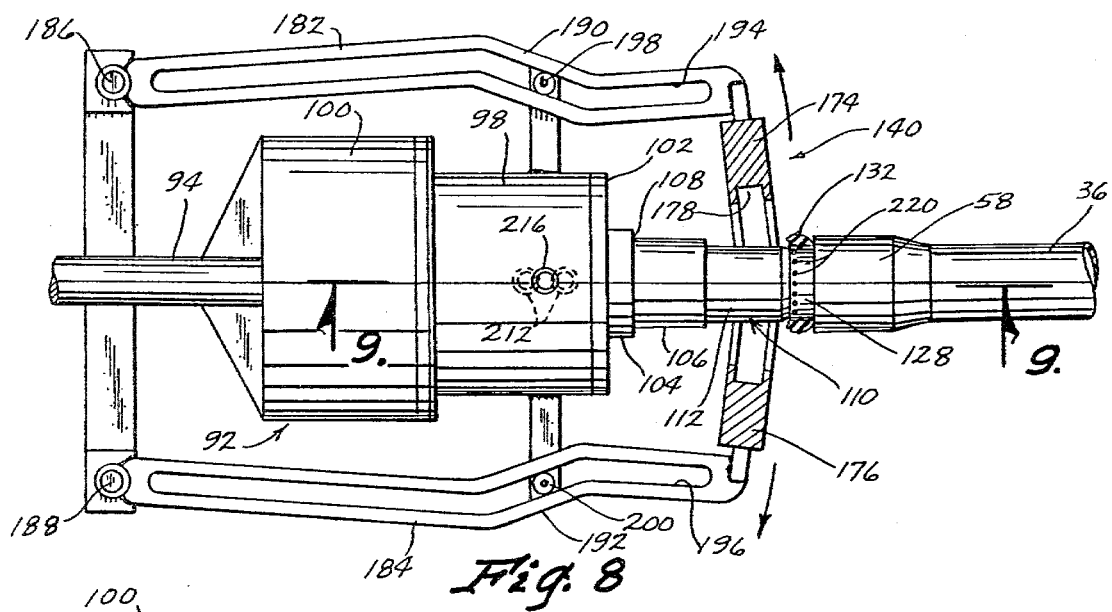
FIG. 8 is top partially sectional view, similar to FIG. 7, but showing the mandrel further advanced for carrying the gasket forwardly of the gasket holding ring.

The inplace gasket belling machine, indicated generally at 10 in FIG. 1, includes an elongated main frame 12 and a tilt clamp fixture 14 at one end of the frame for receiving and securely holding a pipe to be belled.

The tilt clamp fixture 14 includes an elongated tilt bar 16 pivotally supported intermediate its ends on a stub shaft 18 carried between a pair of upstanding brackets 20 on the main frame 12. The tilt bar has a generally saddle shaped upstanding pipe support bracket 22 at one end and a pipe clamp 24 at the other end for cooperatively securely holding a pipe relative to the tilt bar 16. A hydraulic cylinder 26 is pivotally connected between the tilt bar 16 and main frame 12 for pivotally moving the tilt bar between the belling position shown in FIG. 1 and the heating position shown in FIG. 3, as will be further described hereinbelow.

The pipe clamp 24, shown best in FIGS. 1 and 2, has a pair of arcuate clamp jaws or arms 28 interconnected for pivotal movement about a common longitudinally extended clamp pin 30. The clamp pin pivotally supports the arms 28 on an upstanding frame 32 rigidly connected to the rearward end of the tilt bar 16. The clamp arms 28 have semi-cylindrical clamping surfaces 34 adapted to be closed in clamping relation against opposite sides of a pipe 36, as shown in FIG. 2. The clamp arms 28 are pivotally moved in unison by a toggle mechanism including a pair of pivot links 38 and 40 which are pivotally connected to one end of a hydraulic cylinder unit 42 carried on the frame 32. Thus the clamp arms 28 are closed in response to extension of the hydraulic cylinder unit 42 and opened in response to retraction of the cylinder unit 42.

To deliver a pipe to the tilt clamp fixture 14, an automatic beller feed assembly is provided, as shown in FIG. 2. A downwardly inclined pipe delivery rack 46 is supported laterally of the tilt clamp fixture 14. A tipping trough 48 is pivotally connected to the outer edge of the rack 46 and positioned for receiving a pipe 36 from an extruding machine (not shown). After opening the clamp arms 28 of the pipe clamp 24, a hydraulic cylinder unit 50 may be extended to pivot trough 48 upwardly to allow the pipe 36 to roll down the rack 46 and into the pipe clamp 24 and saddle bracket 22. Likewise, to discharge a pipe from the tilt clamp fixture 14 upon completion of the belling operation, the pipe clamp 24 is again opened allowing the finished pipe to roll away from the fixture on a discharge ramp 52 as indicated by arrow 54 in FIG. 2.

To heat the pipe end portion 58 which is to be belled, there is provided a heating bell 60 supported on the main frame 12 rearwardly of and below the pipe clamp 24 in its elevated pipe receiving position. Referring to FIGS. 1 and 3, it is seen that the heating bell 60 is supported on one end of a hydraulic cylinder unit 62 for movement between retracted position shown in FIG. 1 and the extended heating position shown in FIG. 3. It is seen in FIG. 3 that when the tilt clamp fixture 14 is tilted to the heating position therefor, the pipe 36 is axially aligned with the heating bell 60 for movement of the heating bell onto and around the pipe end portion 58. Heating bell 60 is a generally cup-shaped member having a generally cylindrical sidewall 64, a closed rear wall 66 and an open end 68. A hinged cover 70 is adapted to close the open end 68 in the retracted position of the heating bell (FIG. 1) to prevent the entry of dirt or other matter therein.

Referring to FIG. 4, it is seen that the sidewall 64 includes a pair of generally cylindrical wall portions 72 and 74 arranged one within the other such that a generally cylindrical space 76 is formed therebetween. Space 76 is of a diameter for receiving the pipe end portion 58 as shown.

To heat the pipe end portion 58 within the heating bell 60, preheated fluid is pumped through a main supply conduit 78 and through circumferentially spaced inner and outer supply conduits 80 and 82 which communicated with openings at the forward ends of the wall portions 72 and 74 for circulating the heating fluid over the inside and outside surfaces of the pipe end portion 58. A drain conduit 84 communicates with the lowermost corner of the heating bell 60 for returning the heating fluid to a reservoir (not shown). A pair of annular seals 86 and 88 close the open end of cylindrical space 76 to prevent the flow of heating fluid outwardly therethrough. The seals also serve to clean the fluid from the pipe end portion as the heating bell 60 is withdrawn axially from the pipe. Fluid which does pass forwardly of the seals drains through a conduit 90 to a separate tank (not shown).

A preferred fluid to be circulated through the heating bell is glycerin preheated to a temperature of about 320° F.

It can be seen in FIG. 3 that by withdrawing the heating bell 60 from the pipe end portion 58 in selected intermittent steps, the rearward end 90 of the pipe will be heated for a longer duration than the upstream end 91 of the pipe end portion 58. Thus the temperature of the end of the pipe may be precisely controlled and maintained at a substantially higher temperature than the upstream portion 91. A temperature gradient is thus created along the pipe end portion 58.

Once the heating bell 60 is completely withdrawn from the pipe end portion 58, the tilt bar 16 is pivoted to the belling position therefor as shown in FIG. 1 wherein the pipe 36 is disposed in axial alignment with a belling mandrel 92 carried on the rearward end of the main frame 12. The mandrel 92 is axially aligned with and supported on the forward end of a piston 94 of a mandrel cylinder unit 96. Thus actuation of the cylinder unit 96 is effective to move the mandrel 92 longitudinally toward and away from the pipe end portion 58.

Figure 9:
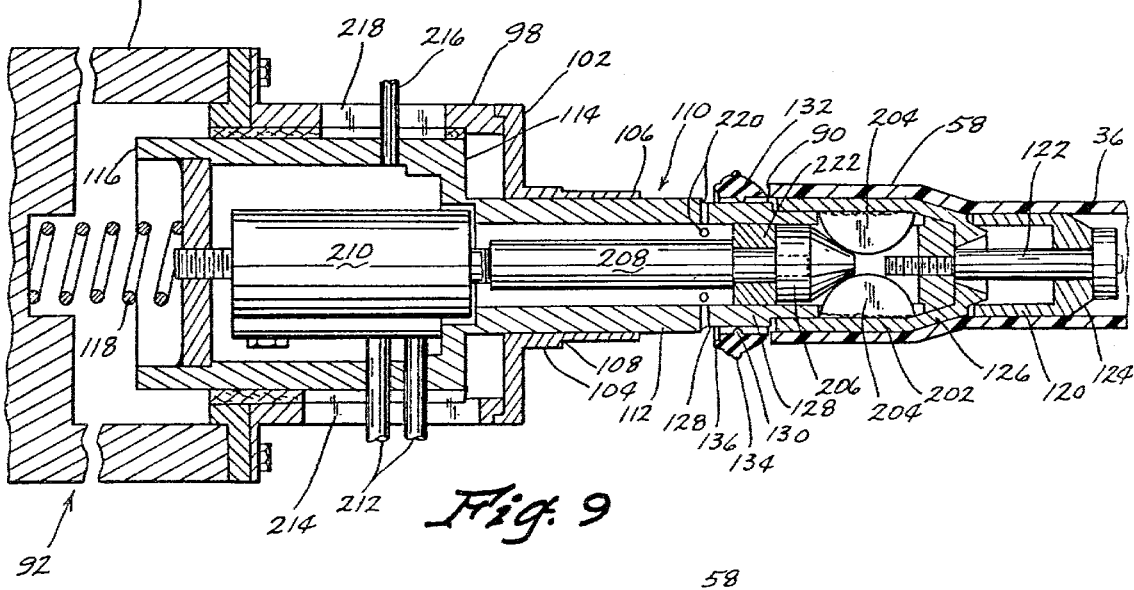
FIG. 9 is side sectional view, taken along line 9—9 in FIG. 8, showing the internal construction of the mandrel.

Referring to FIGS. 6 and 9, it can be seen that the mandrel 92 includes a generally cylindrical outer housing 98 having a rear closure portion 100 bolted thereto. A front cover plate 102 on outer housing 98 has a central opening therethrough defined by a forwardly extended stop sleeve 104 and a gasket positioning sleeve 106 extended forwardly from stop sleeve 104. The gasket positioning sleeve 106 is of a lesser outside diameter than the stop sleeve 104 to define a radially extended stop shoulder 108 at the juncture therebetween.

Telescopically received within the mandrel outer housing 98 is a mandrel body portion 110 including a forwardly extended cylindrical portion 112 slidably supported within the gasket positioning sleeve 106. Rearwardly of the cylindrical portion 112, the body portion 110 has a radially directed annular surface 114 engageable with the front cover plate 102 to define a forward limit position for the body portion relative to said outer housing. A rearward limit position for said body portion 110 is defined by engagement of the rearward end 116 of the body portion 110 with the rear closure portion 100 of outer housing 98. A spring 118 is arranged in compression between the body portion 110 and rear closure portion 100 to urge the body portion toward the forward limit position therefor.

Referring again to FIGS. 6 and 9, a nose member 120 is secured to the front end of the mandrel body portion 110 by a bolt 122. The nose member 120 is generally cylindrical with an outer diameter approximately equal to the inner diameter of a pipe to be belled. A forwardly and inwardly tapered frustoconical surface 124 on the forward end of the nose member 120 serves to guide the mandrel into the end of a pipe to be belled.

Rearwardly of the nose member 120 the mandrel body portion 110 includes a rearwardly and outwardly flared pipe expanding portion 126 which will be further described hereinbelow. Rearwardly of the flared portion 126, the mandrel body portion 110 includes a recessed or radially depressed gasket carrying portion 128. The depressed diameter of the gasket carrying portion 128 is adapted to accommodate an inwardly extended flange 130 on a gasket 132 as shown in cross section in FIG. 9, so that the generally cylindrical inside surface 134 of the gasket is generally continuous with the outside diameter of the mandrel body portion 110 rearwardly thereof. Gasket 132 has an arcuate outer surface with additional outwardly and rearwardly extended annular flanges 134 and 136 respectively.

To automatically place a gasket 132 onto the mandrel 92, there is provided a gasket magazine 138 (FIG. 1) supported on the main frame 12 above the mandrel 92 and a gasket holding ring 140 supported in the path of the mandrel 92 and adapted for receiving a gasket from the magazine 138.

The gasket magazine 138 includes an elongated housing 142 as shown in FIGS. 1 and 2, said housing having closed sidewalls 144, and a generally continuous top wall 146, bottom wall 148 and opposite end walls 150 and 152. A conveyor means is trained about a pair of longitudinally spaced-apart transverse rollers 154 and 156 extended transversely through the housing 142. The conveyor means carries a plurality of spaced-apart support members 158 directed perpendicularly to the conveyor means for defining gasket-receiving compartments 160 between the support members. The bottom wall 48 is provided with an opening at 162 above the gasket holding ring 140. When the conveyor means is advanced to register a compartment 160 with the opening 162, a gasket is dispensed from the compartment through the opening by gravity and into the gasket holding ring 140.

Coacting means is provided on the gasket magazine 138 and mandrel 92 for automatically advancing the conveyor means by one compartment in response to rearward movement of the mandrel to its retracted position shown in FIG. 1. The coacting means includes a rock arm 164 pivotally connected to roller 156 by a one-way clutch 166 for rotating the roller 156 in response to clockwise pivotal movement of the rock arm 164 as seen in FIG. 1. A depending lever 168 is pivotally connected to the housing 142 at 170. A linkage 172 interconnects the rock arm 164 and lever 168 for pivotal movement in unison. The lower end of lever 168 extends downwardly into the path of the mandrel 92 such that rearward movement of the mandrel causes the outer housing 98 to abut against the lower end of lever 168 to pivot the same in a clockwise direction in response to rearward movement of the mandrel 92.

The gasket dispensed from the magazine 138 is received within the gasket holding ring 140 shown in FIG. 5. Ring 140 includes separable side portions 174 and 176 which, when engaged, define a vertical gasket receiving slot 178 adapted for receiving a gasket from the magazine and supporting the gasket in registration with a central opening 180 adapted for receiving the forward portion of the mandrel 92 as it is advanced forwardly toward the pipe 36.

The ring side portions 174 and 176 are supported on the forward ends of respective elongated support arms 182 and 184, the rearward ends of which are pivotally supported relative to the main frame 12 about upright axes 186 and 188 respectively on opposite sides of the mandrel 92. The support arms include inwardly converging medial portions 190 and 192 and elongated cam slots 194 and 196.

The outer housing 98 of the mandrel carries a pair of upright cam pins 198 and 200 in laterally spaced relation therefrom for receipt within the cam slots of the support arms. It can be seen in FIG. 7 that the cam pins engage the inwardly converging medial portions of the cam slots at the time the gasket holding ring 140 is registered with the gasket carrying portion 128 of the mandrel. It can be seen in FIG. 8 that continued forward advancement of the mandrel pivots the support arms 182 and 184 outwardly to separate the side portions 174 and 176 of the gasket holding ring for passage of the mandrel between the separated side portions. Likewise, the coacting cam pins 198 and 200 and cam slots 194 and 196 are effective to re-engage the gasket holding ring side portions together in response to rearward movement of the mandrel to its retracted position of FIG. 6.

It can be seen in FIG. 7 that as the mandrel is advanced through the gasket holding ring 140, the flared portion 126 of the mandrel is simultaneously advanced into the heated end portion 58 of the pipe to radially expand the same. Note that forward advancement of the mandrel is controlled by the mandrel cylinder unit 96 and that the mandrel body portion 110 begins to telescope into the outer housing 98 at the point of initial contact of the mandrel with the end of the pipe.

Figure 10:
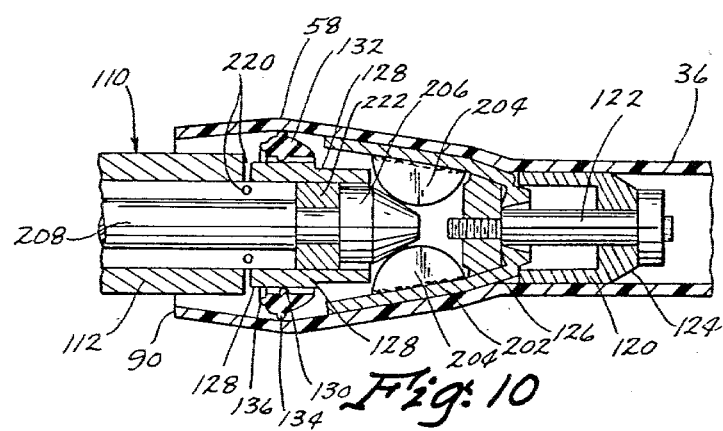
FIG. 10 is a detail side sectional view of a forward portion of the mandrel showing the radially expanded segments for expanding the pipe to receive a gasket.
Figure 11:
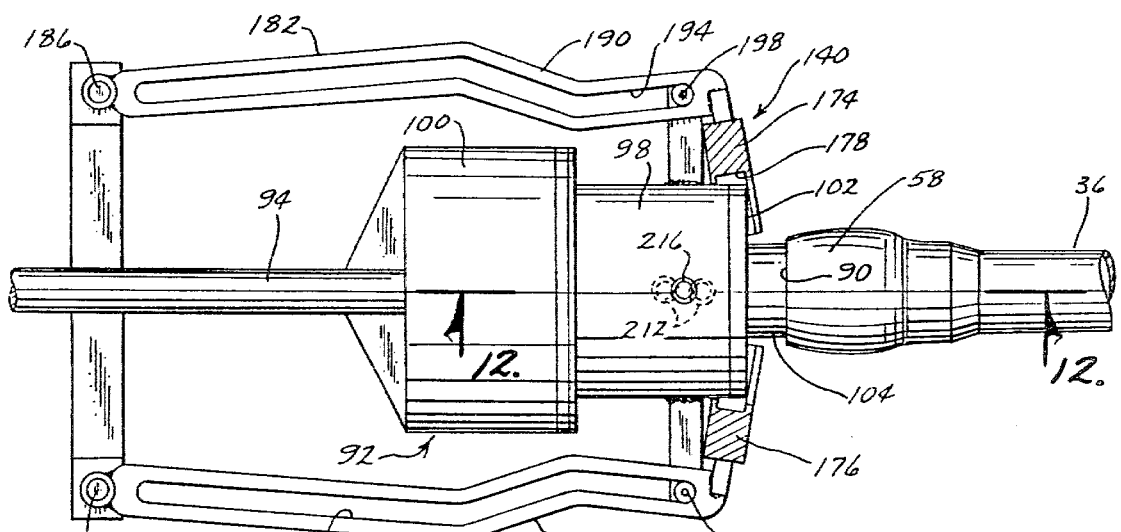
FIG. 11 is a top partially sectional view, similar to FIG. 8, showing the outer portion of the mandrel fully advanced into engagement with the end of the pipe.

Referring to FIGS. 9 and 10, the flared portion 126 of the mandrel includes three circumferentially spaced segments 202 rockably secured at their forward ends between the front of the mandrel and the nose member 120 for movement of the rear ends radially of the mandrel. Each segment or jaw 202 has a hemispherical cam member 204 welded to its inner side. The segments 202 are expanded by forward axial movement of a cone shaped cam member 206 between the hemispherical cam members 204. The cone shaped cam member is secured to the forward end of a cylindrical drive member 208 secured to the piston of a hydraulic cylinder unit 210 supported within the mandrel body portion 110. Accordingly, the segments 202 are radially expanded in response to extension of hydraulic cylinder 210 and they are free to collapse radially in response to retracttion of cylinder 210 to the position shown in FIG. 9. It can be seen that the hydraulic lines 212 extend outwardly of the mandrel body portion 110 through an elongated slot 214 in the mandrel outer housing 98 to accommodate relative telescoping movement between the mandrel portions.

Vacuum means associated with the mandrel body portion 110 for a purpose described hereinbelow includes a vacuum tube 216 inserted through a second elongated slot 218 in outer housing 98 and through the mandrel body portion for communication with the interior thereof. A plurality of circumferentially spaced openings 220 are formed through the rearward end of the mandrel gasket carrying portion 128. The interior of the mandrel body portion 110 thus forms a vacuum chamber sealed at the forward end by an annular seal 222 carried on drive member 208 and sealed at the other end by the rear wall on which the cylinder 210 is mounted. An annular clearance is provided between the forward end of the cylinder 210 and rearward end of the mandrel cylindrical portion 112 to provide communication between the vacuum openings 220 and vacuum tube 216.

The operation of the inplace gasket belling machine is as follows. Hydraulic cylinder 50 is first actuated for raising the tipping trough 48 to deliver a pipe to the tilt clamp fixture 14. The pipe is received in the open clamp arms 28 of pipe clamp 24 and onto the saddle bracket 22. Upon extension of hydraulic cylinder 26, the pipe clamp is closed and hydraulic cylinder 26 is extended to tilt the pipe approximately 15° to the heating position shown in FIG. 3. The heating bell cylinder 60 is then extended to advance the heating bell onto the pipe end portion 58. Heated glycerin is pumped through the heating bell and the hydraulic cylinder 62 is retracted in intermittent steps for precision stepped heating of the pipe end portion 58. When the heating bell 60 is withdrawn clear of the pipe, the tilt bar 16 is pivoted to move the pipe to the belling position therefor shown in FIG. 1 in axial alignment with the belling mandrel 92.

Belling of the heated end portion of the pipe is initiated by extension of the mandrel cylinder 96 whereupon the mandrel is advanced from the retracted position of FIG. 6 to the position of FIG. 7 into and through the gasket holding ring 140 for receiving a gasket onto the gasket carrying portion 128. At this point the mandrel flared portion 126, with its expandable segments 202 collapsed, is being advanced into the heated end portion of the pipe and the mandrel body portion 110 has begun to telescope into the outer housing 98.

Continued forward advancement of the outer housing 98 is effective to laterally separate the side portions 174 and 176 of the gasket holding ring 140 by the coaction of the cam pins 198, 200 in the cam slots of the support arms 182, 184. As the gasket 132 approaches the end of the pipe, FIGS. 8 and 9, a limit switch (not shown) energizes a solenoid to initiate the extension of hydraulic cylinder 210 within the body portion 110. As shown in FIG. 10, the cone shaped cam 206 is advanced between the hemisperhical cam members 204 to radially expand the segments 202 to enable insertion of the gasket 132 into the end of the pipe. Preferably, the pipe is not expanded so much that clearance is provided between the gasket and pipe, but only enough to allow insertion of the gasket without catching on the end of the pipe. The pliability of the end of the pipe due to heating facilitates such expansion.

Figure 12:
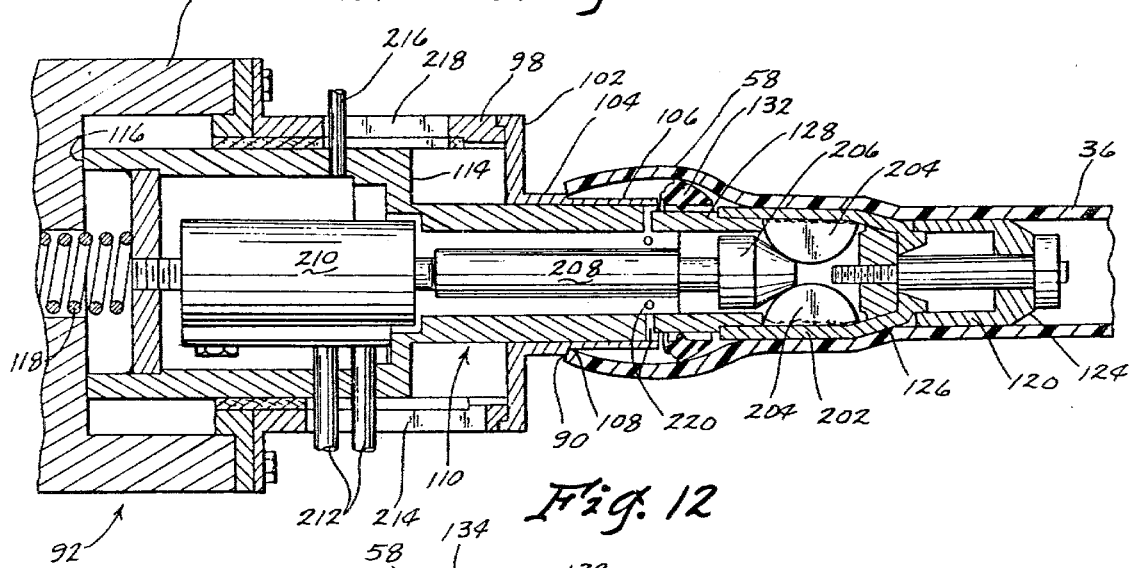
FIG. 12 is a side sectional view, taken along line 12—12 in FIG. 11.
Figure 14:
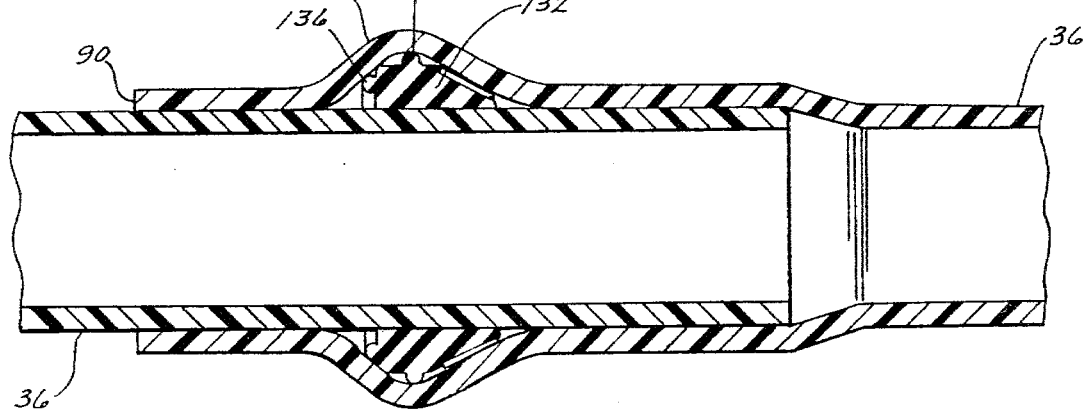
FIG. 14 is a side sectional view of a completed belled end portion of a pipe shown in mating engagement with the opposite end of a second pipe.

Upon continued advancement of the mandrel, the increased friction between the mandrel flared portion 126 and cooler portions of the pipe causes the mandrel body portion 110 to be fully telescoped to its rearward limit position of FIG. 12 against the urging of spring 118. Advancement of the mandrel stops when the stop shoulder 108 engages the end of the pipe. At this point, the gasket positioning sleeve 106 is in contact with the gasket 132 to assure its fixed position relative to the pipe end and to assure that it is clear of the vacuum openings 220. Another limit switch initiates the retraction of hydraulic cylinder 210 to permit the expanding segments 202 to collapse within the pipe end portion.

Figure 13:
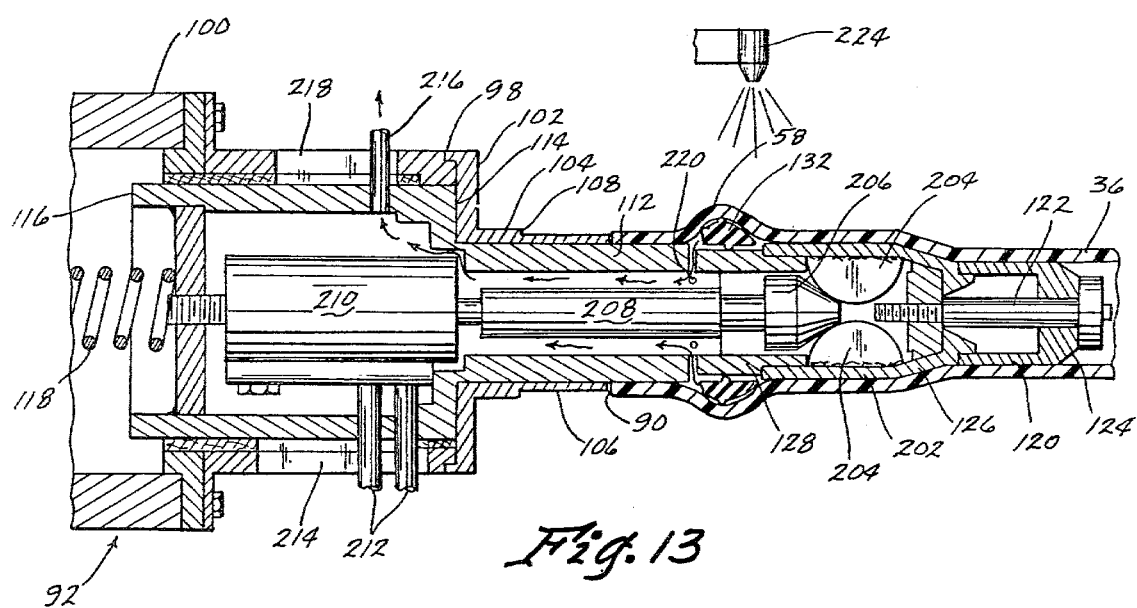
FIG. 13 is a side sectional view of the mandrel, similar to FIG. 12, but showing a gasket positioning sleeve axially withdrawn from the pipe end portion.

Referring to FIG. 13, it is seen that initial retracting movement of the mandrel cylinder effects a withdrawal of only the outer housing 98 to withdraw the gasket positioning sleeve 106 from the end of the pipe. At the same time, the mandrel body portion remains stationary within the belled end of the pipe due to relative telescoping movement between the outer housing 98 and body portion 110 under the urging of spring 118. A vacuum is then applied to the interior of the body portion by the vacuum tube 216 to collapse the heated belled portion of the pipe onto the mandrel. Next, the collapsed belled end of the pipe is showered with cool water from hose means indicated at 224 to cool the pipe from about 300° F. down to approximately room temperature. Since at this point, the mandrel body portion 110 has attained its forward limit position within the outer housing 98, further retraction of the mandrel cylinder 96 is effective to withdraw both portions of the mandrel in unison from the belled end of the pipe.

Retraction of the mandrel causes the separated side portions 174 and 176 of the gasket holding ring 140 to converge together for receiving another gasket from the magazine 138. It is seen in FIG. 1 that retraction of the mandrel forces the outer housing 98 against depending lever 168 which pivots rock arm 164 clockwise to advance another magazine compartment 160 into registration with the opening 162 for dispensing a gasket into the holding ring 140. Finally, the pipe clamp 24 of the tilt clamp fixture 14 is opened for releasing the completed pipe onto the discharge ramp 52 and for receiving another pipe from ramp 46.

It is preferred that the mandrel cylinder 96 be adapted for variable speed operation so that the mandrel may be advanced slowly through the gasket holding ring 140 for receiving a gasket, afterwhich the mandrel is accelerated to facilitate flaring of the pipe and insertion of the gasket 132 into the end of the pipe without obstruction. Once the gasket is within the pipe end portion, the mandrel is again slowed for precision control of the depth of advancement into the pipe. A two-speed mandrel has been found satisfactory for this purpose.

It will be apparent that there has been described herein novel methods of heating and belling one end portion of a pipe independently of the specific apparatus shown and described.

What is claimed is:

1. A method of heating one end portion of a plastic pipe comprising:
   providing a heating bell having a generally continuous sidewall and an open end for receiving said pipe end portion therethrough,
   advancing one of said pipe and heating bell toward the other whereby said pipe end portion is axially inserted through said open end and received within said sidewall,
   directing a flow of heating fluid over the inserted pipe end portion, and
   withdrawing said one of said pipe and heating bell away from the other for removal of the heated pipe end portion from the heating bell,
   said withdrawing step including removing said pipe end portion from said heating bell in selected intermittent steps for step heating of said pipe end portion.

2. The method of claim 1 wherein said withdrawing step includes partially removing the inserted pipe end portion from said heating bell, continuously directing heating fluid onto said inserted pipe end portion to effect a temperature gradient therein, and
   removing the remainder of said pipe end portion from said heating bell.

3. The method of claim 1 including,
   tilting said heating bell so as to position said open end above the opposite end thereof,
   moving said pipe to a heating position in alignment with said heating bell,
   maintaining said pipe in said heating position,
   said advancing step including advancing said heating bell toward and around said pipe end portion, and
   said withdrawing step including withdrawing said heating bell away from said pipe.

4. The method of claim 1 wherein said directing step includes directing a flow of heating liquid over both the inner and outer surfaces of said inserted pipe end portion.

5. The method of claim 4 wherein said heating liquid is glycerin and further comprising preheating said glycerin to a temperature of between 250 and 350 degrees Fahrenheit.

* * * * *